(12) United States Patent
Tsubouchi et al.

(10) Patent No.: US 12,088,912 B2
(45) Date of Patent: Sep. 10, 2024

(54) VEHICLE BOTTOM SURFACE IMAGING SYSTEM

(71) Applicant: TOYOTA JIDOSHA KABUSHIKI KAISHA, Toyota (JP)

(72) Inventors: Takahiro Tsubouchi, Miyoshi (JP);
Masayuki Watanabe, Toyota (JP);
Takamitsu Furuyabu, Toyota (JP);
Takahisa Sudou, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 17/940,210

(22) Filed: Sep. 8, 2022

(65) Prior Publication Data
US 2023/0104320 A1 Apr. 6, 2023

(30) Foreign Application Priority Data
Oct. 4, 2021 (JP) .................................. 2021-163661

(51) Int. Cl.
*H04N 23/90* (2023.01)
*G03B 17/17* (2021.01)
*H04N 23/50* (2023.01)
*H04N 23/66* (2023.01)

(52) U.S. Cl.
CPC ............. *H04N 23/66* (2023.01); *G03B 17/17* (2013.01); *H04N 23/50* (2023.01); *H04N 23/90* (2023.01)

(58) Field of Classification Search
CPC ...................................................... H04N 23/90
See application file for complete search history.

(56) References Cited

FOREIGN PATENT DOCUMENTS

| | | |
|---|---|---|
| JP | 2003-348573 A | 12/2003 |
| JP | 2008-59513 A | 3/2008 |

*Primary Examiner* — Young Lee
(74) *Attorney, Agent, or Firm* — Oblon, McClelland, Maier & Neustadt, L.L.P.

(57) ABSTRACT

A vehicle bottom surface imaging system is equipped with a housing above which a vehicle can pass, first and second reflecting mirrors provided inside the housing and sequentially arranged along a passing direction of the vehicle, and first and second cameras provided inside the housing and arranged apart from each other in a vehicle width direction. The first reflecting mirror reflects the light incident from above the housing onto the first camera. The second reflecting mirror reflects the light incident from above the housing onto the second camera. The first reflecting mirror is so provided as to be changed over between a service state where the light incident from above the housing is reflected onto the first camera and a folded state where the reflected light from the second reflecting mirror onto the second camera is not blocked.

3 Claims, 5 Drawing Sheets

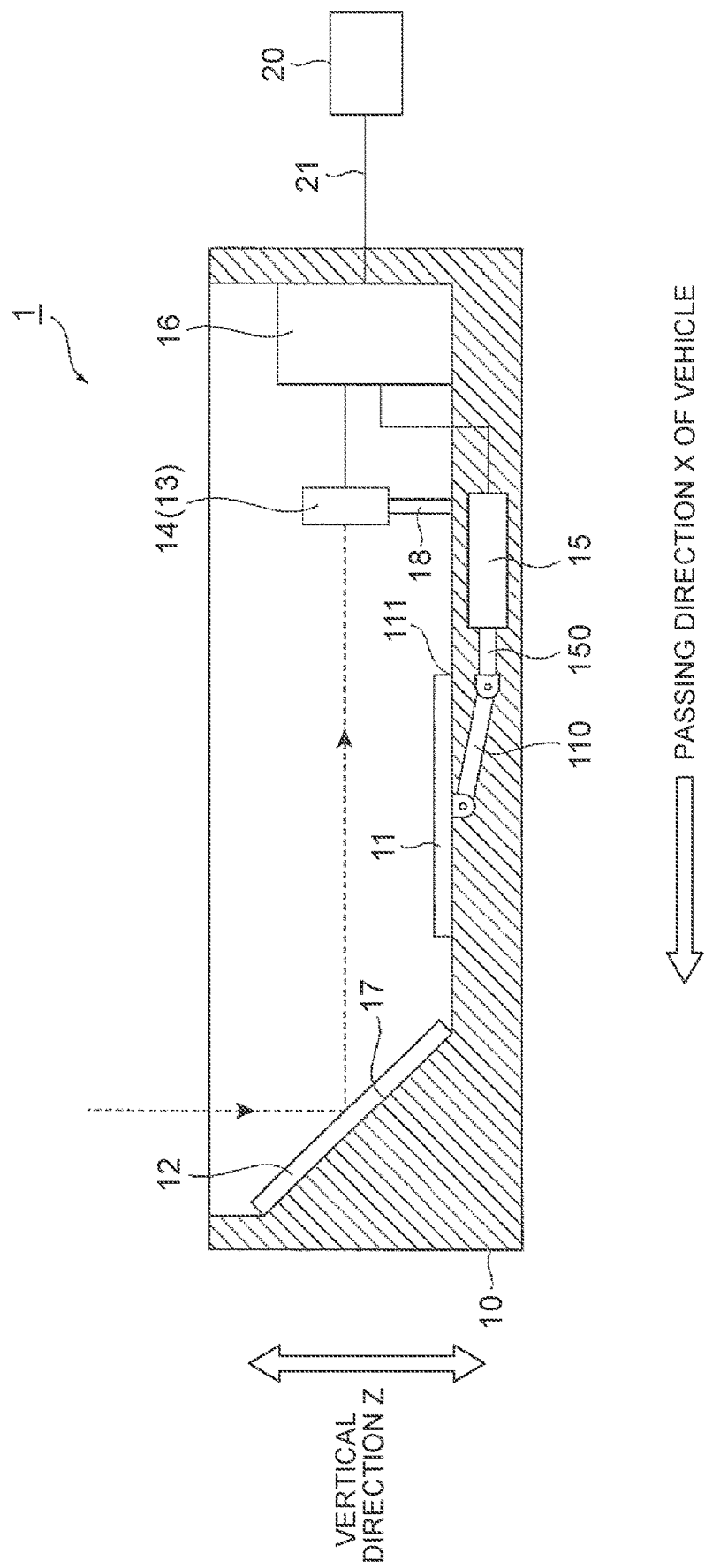

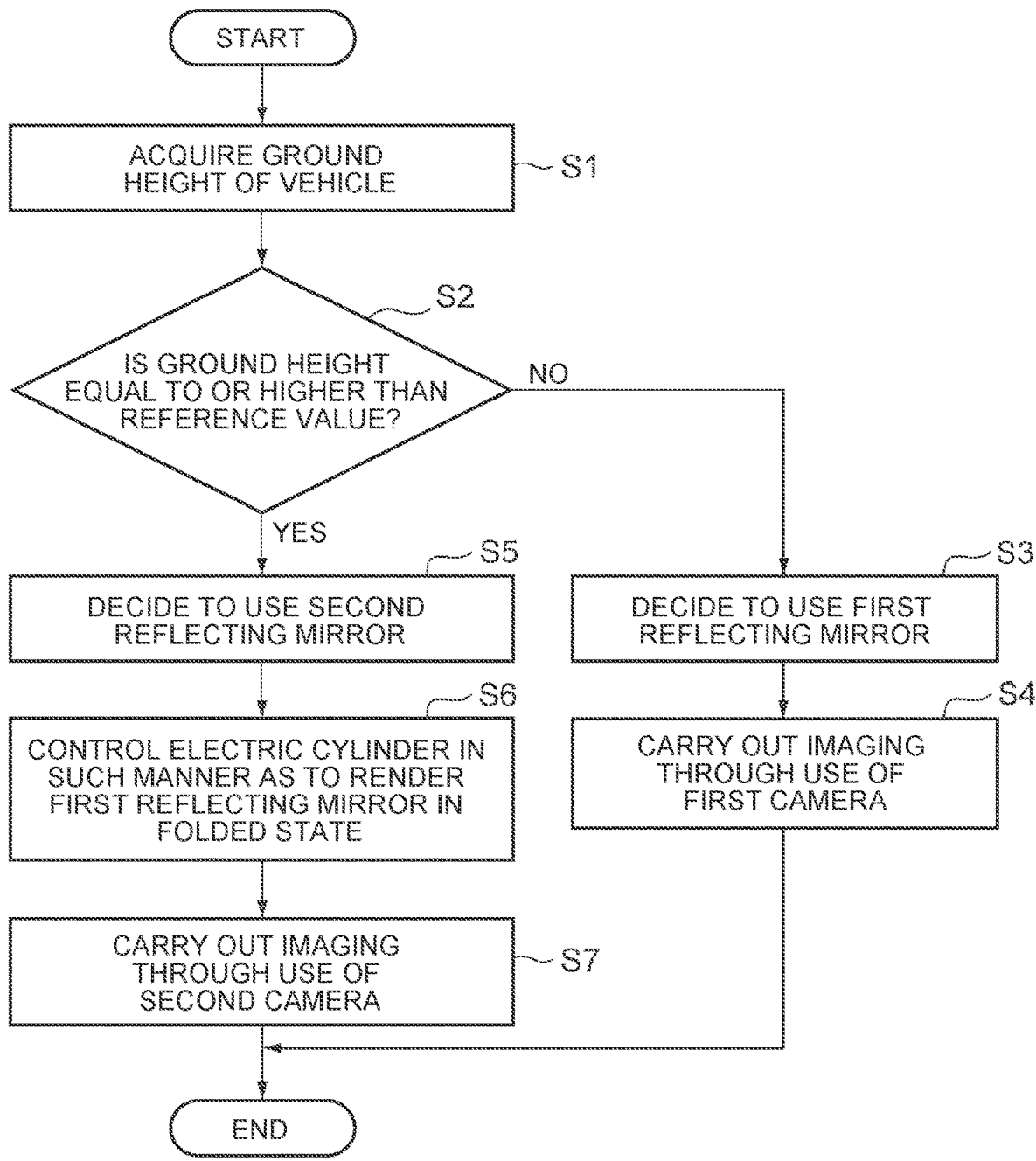

VEHICLE BOTTOM SURFACE IMAGING SYSTEM

CROSS-REFERENCE TO RELATED APPLICATION

This application claims priority to Japanese Patent Application No. 2021-163661 filed on Oct. 4, 2021, incorporated herein by reference in its entirety.

BACKGROUND

1. Technical Field

The disclosure relates to a vehicle bottom surface imaging system.

2. Description of Related Art

Conventionally, what is described in, for example, Japanese Unexamined Patent Application Publication No. 2003-348573 (JP 2003-348573 A) belongs to this technical field. A vehicle bottom surface monitoring device described in JP 2003-348573 A is equipped with a slope, a groove portion that is provided in the slope and that opens upward, and a plurality of cameras arranged inside the groove portion. Then, when a vehicle runs up onto the slope and passes above the groove portion, a bottom surface of the vehicle is imaged through the use of the cameras. Thus, the bottom surface of the vehicle can be monitored easily and reliably.

SUMMARY

However, the foregoing vehicle bottom surface monitoring device has the following problems. First of all, there is a problem of high cost because a large number of cameras are required. Besides, the ground height of the vehicle (i.e., a vertical distance from the ground to the bottom surface of the vehicle) differs depending on the type of the vehicle, and the cameras of the vehicle bottom surface monitoring device cannot cope with the difference in distance. Therefore, there is a problem of a deterioration in the precision of an imaged image resulting from an out-of-focus state (a problem of so-called blurring). It is conceivable to carry out imaging through the use of, for example, a wide-angle lens to solve the problem of blurring. However, there arise a problem of complication of a control mechanism that performs optical processing, and a problem of cost increase resulting therefrom.

The disclosure has been made to solve these technical problems. It is an object of the disclosure to provide a vehicle bottom surface imaging system that can image high-precision images of even vehicles with different ground heights and that can realize cost reduction.

A vehicle bottom surface imaging system according to the disclosure is a vehicle bottom surface imaging system that images a bottom surface of a vehicle. The vehicle bottom surface imaging system is equipped with a housing above which the vehicle can pass, at least a first reflecting member and a second reflecting member that are provided inside the housing and that are sequentially arranged along a passing direction of the vehicle, and at least a first imaging device and a second imaging device that are provided inside the housing and that are arranged apart from each other in a vehicle width direction perpendicular to the passing direction of the vehicle. The first reflecting member reflects the light incident from above the housing onto the first imaging device. The second reflecting member reflects the light incident from above the housing onto the second imaging device. The first reflecting member is provided in such a manner as to be changed over between a service state in which the light incident from above the housing is reflected onto the first imaging device and a folded state in which reflected light from the second reflecting member onto the second imaging device is not blocked.

In the vehicle bottom surface imaging system according to the disclosure, the first reflecting member that reflects the light incident from above the housing onto the first imaging device, and the second reflecting member that reflects the light incident from above the housing onto the second imaging device are sequentially arranged along the passing direction of the vehicle. Therefore, a high-precision image can be imaged by selectively using the first reflecting member or the second reflecting member in accordance with the ground height that differs depending on the type of the vehicle. Besides, when the focusing of the first imaging device for the first reflecting member and the focusing of the second imaging device for the second reflecting member are carried out before imaging the bottom surface of the vehicle, a high-precision image can be imaged without carrying out the focusing of these imaging devices during imaging. Furthermore, the number of imaging devices can be made smaller than before by combining the reflecting members with the imaging devices. Therefore, the cost of the vehicle bottom surface imaging system can be reduced.

Preferably, the vehicle bottom surface imaging system according to the disclosure is further equipped with a ground height acquisition unit that acquires a ground height of the vehicle passing above the housing, a changeover unit that changes over the first reflecting member between the service state and the folded state, and a control unit that controls the changeover unit based on the ground height of the vehicle acquired by the ground height acquisition unit. In this manner, the control unit can selectively use the first reflecting member or the second reflecting member by controlling the changeover unit based on the ground height of the vehicle. Accordingly, the bottom surface of the vehicle can be imaged automatically.

In the vehicle bottom surface imaging system according to the disclosure, the changeover unit is preferably provided inside the housing, and is preferably arranged close to the first reflecting member in such a manner as not to overlap with the first reflecting member, in a plan view of the housing. In this manner, the housing can be made thinner than in the case where the changeover unit and the first reflecting member overlap with each other in the plan view of the housing. As a result, the entire vehicle bottom surface imaging system can be made compact.

The disclosure makes it possible to image high-precision images of even vehicles with different ground heights and realize cost reduction.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a schematic cross-sectional view showing a folded state of a first reflecting mirror; and FIG. 5 is a flowchart showing the behavior of the vehicle bottom surface imaging system.

DETAILED DESCRIPTION OF EMBODIMENTS

One of the embodiments of a vehicle bottom surface imaging system according to the disclosure will be described hereinafter with reference to the drawings. Prior to the description of the embodiment, it will be described how the disclosure has been conceived.

To solve the problems of the aforementioned conventional vehicle bottom surface monitoring device, the inventors of the present application have conducted earnest studies.

In concrete terms, with a view to solving the problem of blurring resulting from the ground height that differs depending on the type of the vehicle, the inventors of the present application have found out that a high-precision image can be imaged by sequentially arranging a plurality of reflecting mirrors apart from one another by predetermined distances along a passing direction of the vehicle, preparing a plurality of imaging units having different angles of field by combining these reflecting mirrors arranged apart from one another by different distances with cameras respectively, and selectively using each of the imaging units in accordance with the ground height that differs depending on the type of the vehicle.

For example, the imaging unit having a wide horizontal angle of view is used to image the bottom surface of a vehicle with a relatively low ground height. On the other hand, the imaging unit having a narrow horizontal angle of view is used to image the bottom surface of a vehicle with a relatively high ground height. Thus, by selectively using the imaging unit having a wide horizontal angle of view or the imaging unit having a narrow horizontal angle of view depending on the ground height that differs depending on the type of the vehicle, a high-precision image can be imaged even in the case of vehicles with different ground heights.

Incidentally, in the present embodiment, the ground height of the vehicle is conceptually different from "the lowest ground height" of the vehicle. "The lowest ground height" means a vertical distance from the ground to the lowest portion of a vehicle body, whereas the ground height of the vehicle means a vertical distance from the ground to the bottom surface of the vehicle. Moreover, the vertical distance from the ground to the bottom surface of the vehicle differs depending on the sizes, shapes, and the like of various components attached to the bottom surface of the vehicle. For example, however, an average of vertical distances from the ground to several spots ranging from a front portion of the bottom surface of the vehicle to a rear portion of the bottom surface of the vehicle may be regarded as the ground height of the vehicle. Alternatively, a vertical distance from the ground to one of the front portion, a central portion, and the rear portion of the bottom surface of the vehicle may be regarded as the ground height of the vehicle.

Figure 1:
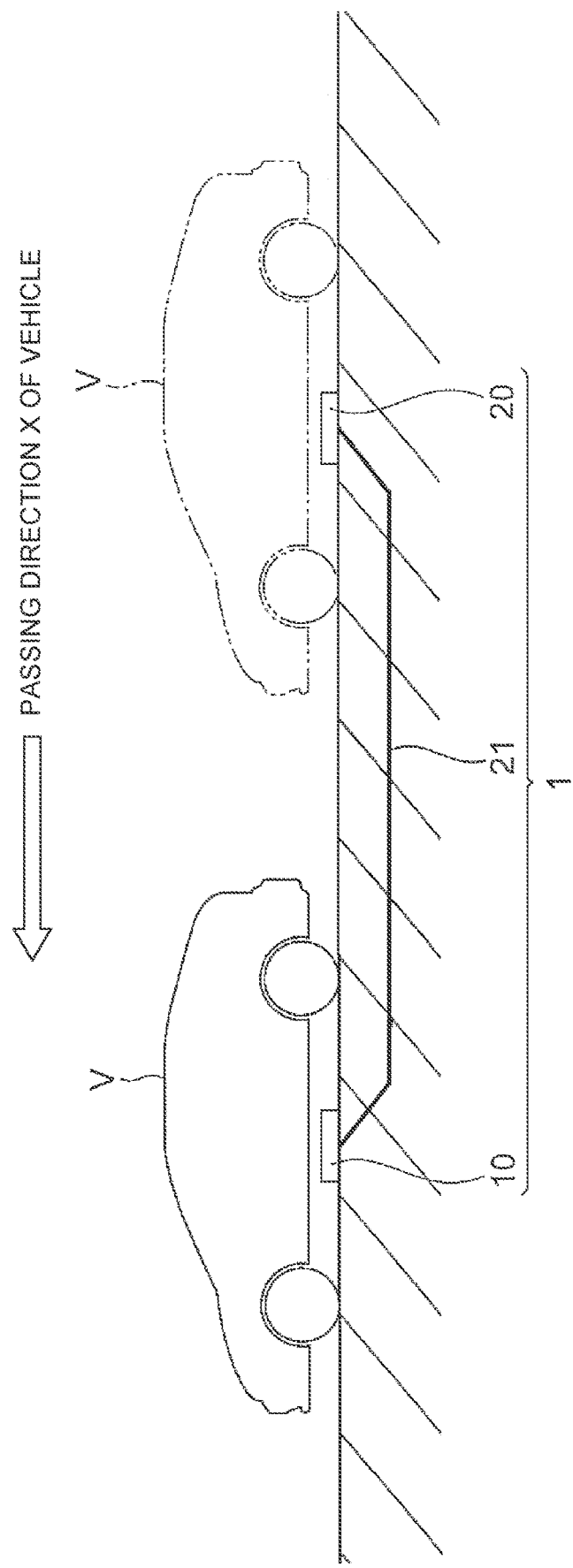
FIG. 1 is a schematic view showing a scene to which a vehicle bottom surface imaging system according to one of the embodiments is applied.

FIG. 1 is a schematic view showing a scene to which a vehicle bottom surface imaging system 1 according to the embodiment is applied. The vehicle bottom surface imaging system 1 according to the present embodiment is a system for imaging a bottom surface of a vehicle V passing above a housing 10 through the use of a camera provided inside the housing 10, and confirming states (e.g., rusted states) of various components arranged on a bottom of the vehicle or the presence or absence of a suspicious object attached to the bottom of the vehicle or the like, based on an imaged image. The vehicle bottom surface imaging system 1 is equipped with the housing 10 above which the vehicle V can pass, and a distance measuring sensor 20 arranged in front of the housing 10 in a passing direction X of the vehicle V. Incidentally, the image mentioned in the present embodiment may be at least one of a static image and a dynamic image.

Figure 2:
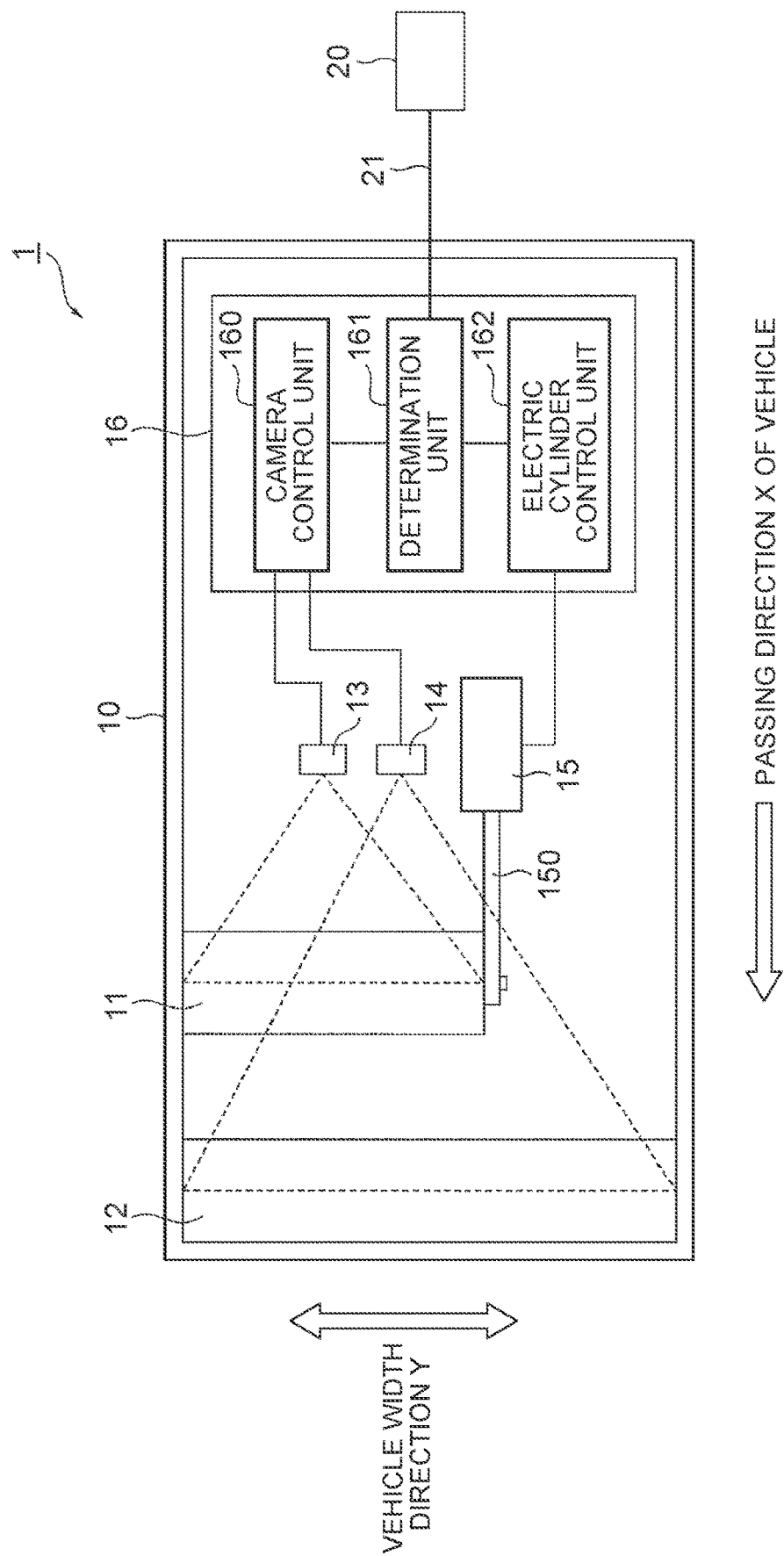
FIG. 2 is a schematic plan view showing the structure of the vehicle bottom surface imaging system.
Figure 3:
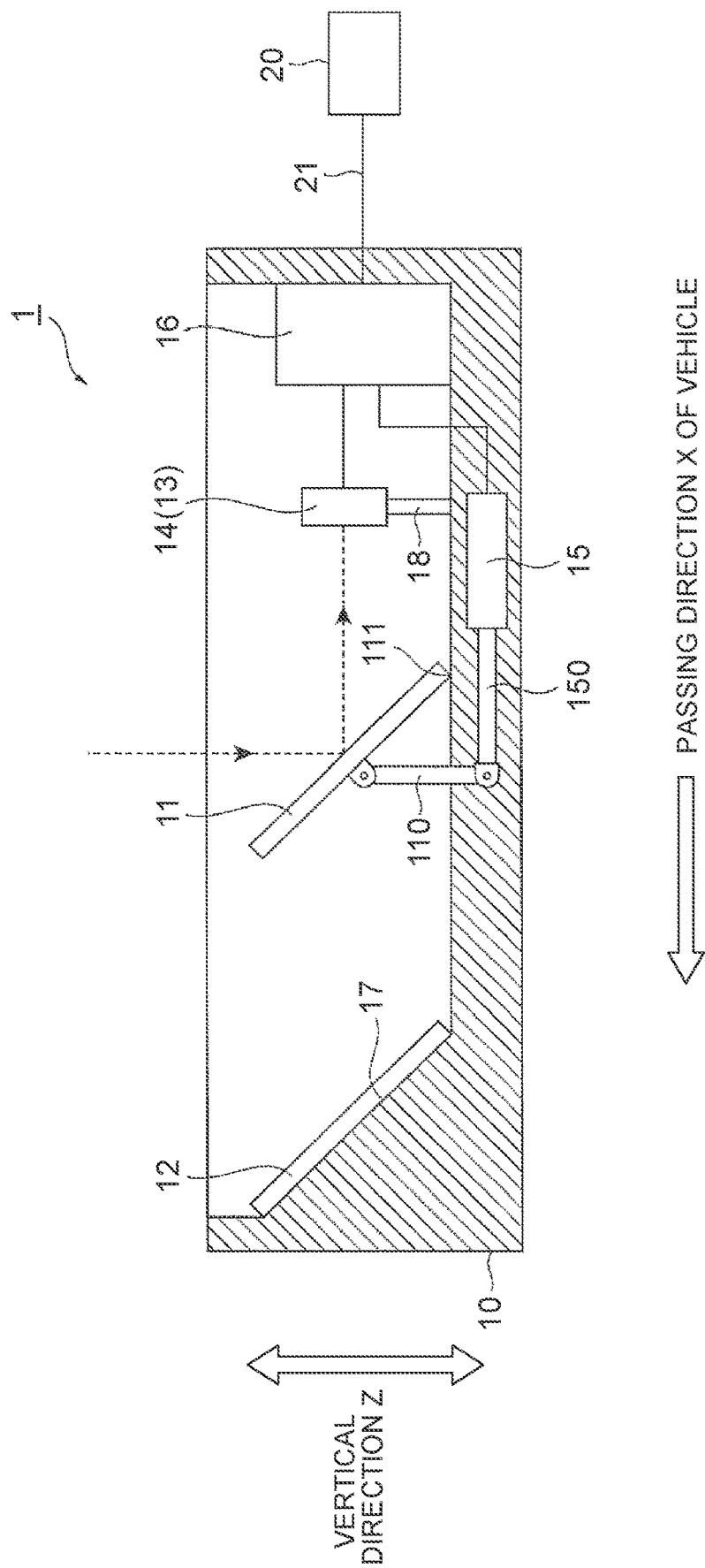
FIG. 3 is a schematic cross-sectional view showing the structure of the vehicle bottom surface imaging system.

FIG. 2 is a schematic plan view showing the structure of the vehicle bottom surface imaging system. FIG. 3 is a schematic cross-sectional view showing the structure of the vehicle bottom surface imaging system. FIG. 4 is a schematic cross-sectional view showing a folded state of a first reflecting mirror. As shown in, for example, FIG. 2 and FIG. 3, the housing 10 assumes the shape of a flat box opening upward, and is formed of, for example, a metal material or a hard resin material. With a view to enhancing the portability and usability of the vehicle bottom surface imaging system 1, the housing 10 of the present embodiment is formed with a height that is lower than a lowest ground height (e.g., 50 mm) of the vehicle and with a width that is smaller than a distance between right and left wheels of the vehicle, so as to be usable by being simply laid on the ground without being provided with an inclined surface portion such as a slope. Incidentally, the housing 10 depicted in FIG. 2 and FIG. 3 does not have any lid. However, the housing 10 may further have a lid covering an opening thereof.

Two reflecting mirrors (a first reflecting mirror 11 and a second reflecting mirror 12) and two cameras (a first camera 13 and a second camera 14) are provided inside the housing 10. The first reflecting mirror 11 is equivalent to "the first reflecting member" mentioned in the claims, and reflects the light incident from above the housing 10 onto the first camera 13. The second reflecting mirror 12 is equivalent to "the second reflecting member" mentioned in the claims, and reflects the light incident from above the housing 10 onto the second camera 14. The first reflecting mirror 11 and the second reflecting mirror 12 are arranged in this order along the passing direction X of the vehicle. That is, the first reflecting mirror 11 is arranged in front of the second reflecting mirror 12 in the passing direction X of the vehicle.

As shown in FIG. 2, the first reflecting mirror 11 is formed with a width smaller than that of the second reflecting mirror 12, in a vehicle width direction Y perpendicular to the passing direction X of the vehicle. For instance, the width of the first reflecting mirror 11 is 316 mm, and the width of the second reflecting mirror 12 is 590 mm. Moreover, the first reflecting mirror 11 and the second reflecting mirror 12 are arranged such that one end (a right end in FIG. 2) of the first reflecting mirror 11 and one end (a right end in FIG. 2) of the second reflecting mirror 12 are aligned with each other.

Besides, as shown in FIG. 3, the first reflecting mirror 11 and the second reflecting mirror 12 are arranged with the same height in a vertical direction Z. The first reflecting mirror 11 is arranged at an angle of 45° with respect to the passing direction X of the vehicle with the aid of a link mechanism 110. The second reflecting mirror 12 is fixed to an inclined surface portion 17 of the housing 10. The inclined surface portion 17 is inclined at an angle of 45° with respect to the passing direction X of the vehicle. For instance, both the first reflecting mirror 11 and the second reflecting mirror 12 that are arranged at an angle of 45° with respect to the passing direction X of the vehicle have a height of 40 mm in the vertical direction Z.

The first reflecting mirror 11 is arranged in front of the second reflecting mirror 12 in the passing direction X of the vehicle, and the first reflecting mirror 11 and the second reflecting mirror 12 have the same height in the vertical direction. Therefore, the first reflecting mirror 11 blocks part of the reflected light from the second reflecting mirror 12. The first reflecting mirror 11 is configured in a foldable manner so as not to block the reflected light from the second reflecting mirror 12, at the time of imaging through the use of the second reflecting mirror 12 and the second camera 14. That is, the first reflecting mirror 11 of the present embodiment assumes either a service state in which the light incident from above the housing 10 is reflected onto the first camera 13, and a folded state in which the reflected light from the second reflecting mirror 12 onto the second camera 14 is not blocked, and is configured to be changed over between these states. The changeover between the service state and the folded state of the first reflecting mirror 11 will be described later.

The first camera 13 is equivalent to "the first imaging device" mentioned in the claims. The second camera 14 is equivalent to "the second imaging device" mentioned in the claims. Each of the first camera 13 and the second camera 14 is formed by a charge coupled devices (CCD) camera, a complementary metal oxide semiconductor (CMOS) camera, or the like. The first camera 13 and the second camera 14 are arranged apart from each other by a predetermined distance in the vehicle width direction Y.

The first camera 13 and the second camera 14 are fixed to a bottom of the housing 10 via a camera fixation member 18 so as to have the same height with respect to the bottom of the housing 10. For instance, the first camera 13 and the second camera 14 are fixed to the housing 10 such that the center of each of the cameras has a ground height of 30 mm.

Moreover, the first camera 13 corresponds to the first reflecting mirror 11, and has a horizontal angle of view within which the first reflecting mirror 11 is confined. The second camera 14 corresponds to the second reflecting mirror 12, and has a horizontal angle of view within which the second reflecting mirror 12 is confined. Moreover, the first camera 13 and the first reflecting mirror 11 constitute an imaging unit having a relatively wide horizontal angle of view (e.g., 165°), and correspond to the imaging of the bottom surface of any vehicle with a relatively low ground height. On the other hand, the second camera 14 and the second reflecting mirror 12 constitute an imaging unit having a relatively narrow horizontal angle of view (e.g., 150°), and correspond to the imaging of the bottom surface of any vehicle with a relatively high ground height.

Each of the first camera 13 and the second camera 14 is electrically connected to a control unit 16 (which will be described later). The control unit 16 controls the imaging start time and imaging end time of each of the first camera 13 and the second camera 14. Besides, each of the first camera 13 and the second camera 14 outputs an imaged image to the control unit 16.

Besides, an electric cylinder 15 and the control unit 16 are provided inside the housing 10. The electric cylinder 15 is equivalent to "the changeover unit" mentioned in the claims, and cooperates with the link mechanism 110 supporting the first reflecting mirror 11 to change over the first reflecting mirror 11 between the service state (see FIG. 3) and the folded state (see FIG. 4). More specifically, when a rod 150 retracts in response to, for example, reverse rotation of a motor attached to the electric cylinder 15, the link mechanism 110 coupled to the rod 150 is pulled, and the first reflecting mirror 11 gradually falls with a contact point 111 thereof that is in contact with the bottom of the housing 10 serving as a fulcrum. The entire first reflecting mirror 11 eventually comes into contact with the bottom of the housing 10 (see FIG. 4). FIG. 4 shows the folded state of the first reflecting mirror 11. On the other hand, when the rod 150 extends in response to positive rotation of the motor of the electric cylinder 15, the link mechanism 110 widens. Thus, the first reflecting mirror 11 erects with the contact point 111 serving as a fulcrum, and assumes the service state shown in FIG. 3.

Besides, in a plan view of the housing 10 shown in FIG. 2, the electric cylinder 15 is arranged close to the first reflecting mirror 11 in such a manner as not to overlap with the first reflecting mirror 11. In this manner, the housing 10 can be made thinner than in the case where the electric cylinder 15 and the first reflecting mirror 11 overlap with each other in the plan view of the housing 10. Therefore, the entire vehicle bottom surface imaging system 1 can be made compact.

The control unit 16 is configured as a microcomputer that is a combination of, for example, a central processing unit (CPU) that performs computation, a read-only memory (ROM) as a secondary storage device in which a program for computation is recorded, and a random access memory (RAM) as a temporary storage device that saves a computation history and temporary control variables. The control unit 16 performs various kinds of control of the vehicle bottom surface imaging system 1 through execution of a stored program.

The control unit 16 has a camera control unit 160, a determination unit 161, and an electric cylinder control unit 162.

The determination unit 161 determines, based on a ground height of the vehicle acquired by the distance measuring sensor 20, whether or not the acquired ground height of the vehicle is equal to or higher than a reference value set in advance. Besides, the determination unit 161 decides, based on a result of the determination, which one of the first reflecting mirror 11 and the second reflecting mirror 12 is to be used. More specifically, if it is determined, as a result of a comparison between the ground height of the vehicle acquired by the distance measuring sensor 20 and the reference value, that the ground height of the vehicle is lower than the reference value, the determination unit 161 decides to use the first reflecting mirror 11 that corresponds to the imaging of the bottom surface of any vehicle with a low ground height. Upon deciding to use the first reflecting mirror 11, the determination unit 161 outputs a command to render the first reflecting mirror 11 in the service state to the electric cylinder control unit 162.

On the other hand, if it is determined, as a result of a comparison between the ground height of the vehicle and the reference value, that the ground height of the vehicle is equal to or higher than the reference value, the determination unit 161 decides to use the second reflecting mirror 12 that corresponds to the imaging of the bottom surface of any vehicle with a high ground height. Upon deciding to use the second reflecting mirror 12, the determination unit 161 outputs a command to render the first reflecting mirror 11 in the folded state to the electric cylinder control unit 162.

The camera control unit 160 controls the changeover between the first camera 13 and the second camera 14 and the imaging start time and imaging end time of each of the cameras, based on a result decided by the determination unit 161. For example, when the use of the first reflecting mirror 11 is decided, the camera control unit 160 controls the imaging start time and imaging end time of the first camera 13 in such a manner as to carry out imaging through the use of the first camera 13 corresponding to the first reflecting mirror 11. On the other hand, when the use of the second reflecting mirror 12 is decided, the camera control unit 160 controls the imaging start time and imaging end time of the second camera 14 in such a manner as to carry out imaging through the use of the second camera 14 corresponding to the second reflecting mirror 12.

Incidentally, the imaging by each of the cameras may be started, for example, immediately at a timing when the control unit 16 acquires the ground height of the vehicle output from the distance measuring sensor 20, or after the lapse of a predetermined time (e.g., two seconds) from the timing when the control unit 16 acquires the ground height of the vehicle. Besides, the imaging by each of the cameras is ended, for example, after the lapse of a predetermined time (e.g., 10 seconds) from the start of imaging.

Besides, the camera control unit 160 stores images imaged by the first camera 13 and the second camera 14.

The electric cylinder control unit 162 controls the electric cylinder 15 based on a command of the determination unit 161, such that the electric cylinder 15 rotates positively or reversely.

The distance measuring sensor 20 is equivalent to "the ground height acquisition unit" mentioned in the claims, and is arranged on the ground spaced apart from the housing 10 by a predetermined distance to acquire a ground height of a vehicle that is about to pass above the housing 10. The distance measuring sensor 20 adopts a time-of-flight (TOF) method adapted to measure a short distance of, for example, 0 to 20 cm, and measures a ground height of the vehicle by measuring a time from the upward projection of laser light to the return thereof to a light-receiving element in the sensor.

As described above, an average of vertical distances to several points between front and rear portions of the bottom surface of the vehicle, or a vertical distance to one of the front portion, the central portion, and the rear portion of the bottom surface of the vehicle may be used as the ground height of the vehicle. In this case, the distance measuring sensor 20 acquires a vertical distance from the bottom surface of a front bumper of the vehicle to the ground as a ground height of the vehicle, so as to output the acquired ground height of the vehicle to the control unit 16 earlier.

The distance measuring sensor 20 is electrically connected to the control unit 16 provided in the housing 10 via a cable 21, and outputs the detected ground height of the vehicle to the control unit 16.

The behavior of the vehicle bottom surface imaging system 1 will be described hereinafter based on FIG. 5. Incidentally, when the vehicle bottom surface imaging system 1 is in an initial state, the first reflecting mirror 11 is in the service state.

First of all, in step S1, the distance measuring sensor 20 acquires a ground height of a vehicle that is about to pass above the housing 10. The distance measuring sensor 20 outputs the acquired ground height of the vehicle to the control unit 16 via the cable 21.

In step S2 following step S1, the determination unit 161 of the control unit 16 determines whether or not the ground height of the vehicle acquired by the distance measuring sensor 20 is equal to or higher than a reference value. The reference value is set in advance based on, for example, actually measured values of ground heights of various kinds of vehicles. Then, if it is determined that the ground height of the vehicle is lower than the reference value, the control process proceeds to step S3. In step S3, the determination unit 161 decides to use the first reflecting mirror 11.

In step S4 following step S3, the camera control unit 160 of the control unit 16 outputs an imaging command to the first camera 13. The first camera 13 images the bottom surface of the vehicle passing above the housing 10 based on the command, and outputs an imaged image to the control unit 16. Incidentally, the imaging start time and imaging end time of the first camera 13 are controlled by the camera control unit 160.

On the other hand, if it is determined in step S2 that the ground height of the vehicle is equal to or higher than the reference value, the control process proceeds to step S5. In step S5, the determination unit 161 decides to use the second reflecting mirror 12.

In step S6 following step S5, the electric cylinder control unit 162 of the control unit 16 controls the electric cylinder 15 so as to render the first reflecting mirror 11 in the folded state. The motor attached to the electric cylinder 15 then rotates reversely, and the rod 150 retracts. Thus, the link mechanism 110 coupled to the rod 150 is pulled, and the first reflecting mirror 11 gradually falls with the contact point 111 that is in contact with the bottom of the housing 10 serving as a fulcrum, and comes into contact with the bottom of the housing 10 (see FIG. 4).

In step S7 following step S6, the camera control unit 160 outputs an imaging command to the second camera 14. The second camera 14 images the bottom surface of the vehicle passing above the housing 10 based on the command, and outputs an imaged image to the control unit 16. The imaging start time and imaging end time of the second camera 14 are controlled by the camera control unit 160.

Upon completion of step S4 or step S7, the series of steps of the control process is ended.

In the vehicle bottom surface imaging system 1 configured as described above, the first reflecting mirror 11 that reflects the light incident from above the housing 10 onto the first camera 13, and the second reflecting mirror 12 that reflects the light incident from above the housing 10 onto the second camera 14 are sequentially arranged along the passing direction X of the vehicle. Accordingly, a high-precision image can be imaged by selectively using the first reflecting mirror 11 or the second reflecting mirror 12 in accordance with the ground height that differs depending on the type of the vehicle. Then, when the focusing of the first camera 13 for the first reflecting mirror 11 and the focusing of the second camera 14 for the second reflecting mirror 12 are carried out before imaging the bottom surface of the vehicle, a high-precision image can be imaged without carrying out the focusing of these cameras during imaging. Besides, the number of cameras can be made smaller than before, by combining the reflecting mirrors with the cameras in this manner. Therefore, the cost of the vehicle bottom surface imaging system 1 can be reduced.

Furthermore, the control unit 16 can selectively use the first reflecting mirror 11 or the second reflecting mirror 12 by changing over the first reflecting mirror 11 between the service state and the folded state via the control of the electric cylinder 15, based on the ground height of the vehicle acquired by the distance measuring sensor 20. As a result, the bottom surface of the vehicle can be automatically imaged based on the ground height of the vehicle.

The disclosure has been described above in detail. However, the disclosure is not limited to the foregoing embodiment, but can be subjected to various design changes within such a range as not to depart from the spirit of the disclosure described in the claims.

For example, although the foregoing embodiment has been described with reference to the example of the two reflecting mirrors (the first reflecting mirror 11 and the second reflecting mirror 12) sequentially arranged along the passing direction X of the vehicle and the two cameras (the first camera 13 and the second camera 14) corresponding thereto respectively. However, the disclosure is also applicable to a case where the vehicle bottom surface imaging system has three or more reflecting mirrors sequentially arranged along the passing direction X of the vehicle and cameras corresponding thereto respectively.

Besides, the changeover unit for changing over the first reflecting mirror 11 between the service state and the folded state may be an air cylinder, a hydraulic cylinder, an actuator or the like instead of the electric cylinder 15.

What is claimed is:

1. A vehicle bottom surface imaging system that images a bottom surface of a vehicle, the vehicle bottom surface imaging system comprising:
    a housing above which the vehicle is able to pass;
    at least a first reflecting member and a second reflecting member that are provided inside the housing and that are sequentially arranged along a passing direction of the vehicle; and
    at least a first imaging device and a second imaging device that are provided inside the housing and that are arranged apart from each other in a vehicle width direction perpendicular to the passing direction of the vehicle, wherein
    the first reflecting member reflects light incident from above the housing onto the first imaging device,
    the second reflecting member reflects light incident from above the housing onto the second imaging device, and
    the first reflecting member is provided in such a manner as to be changed over between a service state in which light incident from above the housing is reflected onto the first imaging device and a folded state in which reflected light from the second reflecting member onto the second imaging device is not blocked.

2. The vehicle bottom surface imaging system according to claim 1, further comprising:
    a ground height acquisition unit that acquires a ground height of the vehicle passing above the housing;
    a changeover unit that changes over the first reflecting member between the service state and the folded state; and
    a control unit that controls the changeover unit based on the ground height of the vehicle acquired by the ground height acquisition unit.

3. The vehicle bottom surface imaging system according to claim 2, wherein
    the changeover unit is provided inside the housing, and
    the changeover unit is arranged close to the first reflecting member in such a manner as not to overlap with the first reflecting member, in a plan view of the housing.

* * * * *